W. A. SHIPPERT.
MILKING MACHINE FOR COWS.
APPLICATION FILED APR. 19, 1918.
1,349,441.
Patented Aug. 10, 1920.
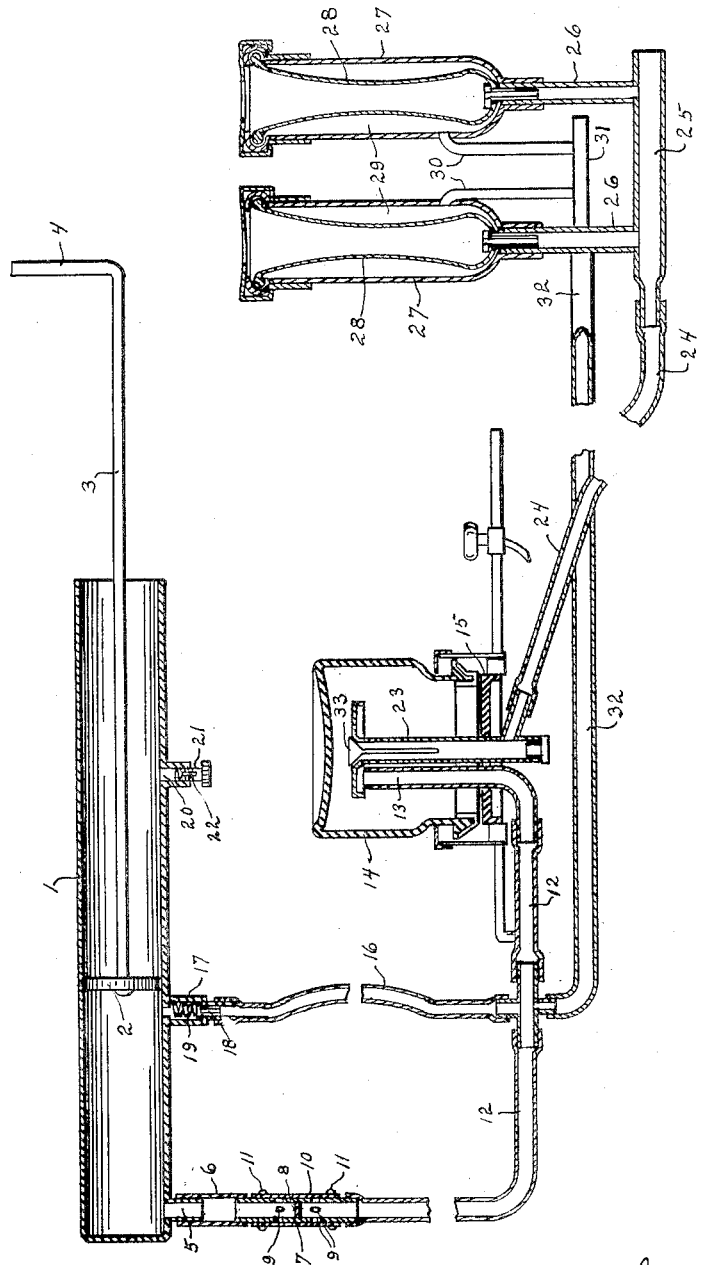
Inventor
Warren A. Shippert,
By Walter N. Haskell,
his Attorney

UNITED STATES PATENT OFFICE.

WARREN A. SHIPPERT, OF CHICAGO, ILLINOIS.

MILKING-MACHINE FOR COWS.

1,349,441.  Specification of Letters Patent.  Patented Aug. 10, 1920.

Application filed April 19, 1918. Serial No. 229,509.

*To all whom it may concern:*

Be it known that I, WARREN A. SHIPPERT, a citizen of the United States, residing at Chicago, in the county of Cook and State of Illinois, have invented certain new and useful Improvements in Milking-Machines for Cows, of which the following is a specification.

My invention has reference to milking machines for cows, and relates more specially to a peculiar construction of the teat-cups, and parts intimately associated therewith.

The principal purpose of my device is to provide a squeeze movement within the teat-cup, closely resembling the action of a human hand, and occurring during the period of the least suction. This results in a massaging operation, and assists in keeping the blood in the udder and teats of the animal in proper circulation.

A similar action has heretofore been produced in connection with machines of a heavy type, employing an iron pipe line to produce a vacuum, and only adapted for use therewith. These machines are cumbersome and expensive to operate. My device can be operated with little power, and is adapted for use with what is known as the pole drive power transmission.

The milk chamber shown in the drawings and referred to in the specification herein, is similar, with a slight modification, to the one shown and described in Letters Patent of the United States, for improvements in milking machines, numbered 1,264,214, issued to myself April 30th, 1918, and the air-pump and controlling devices associated therewith are the same as are set forth in my application for Letters Patent of the United States for improvements in milking machines for cows, filed Mar. 18, 1918, Serial No. 222,999.

The figure of the drawings illustrates, in vertical section, a milking outfit, including part of a cluster of teat-cups equipped with my invention.

1 represents a cylindrical air-pump, 2 the piston thereof, and 3 the piston-rod, ending in a bent arm 4, for connection with suitable actuating mechanism, not shown herein. At its inner end the pump 1 is provided with a nipple 5, connected by a tube 6 with a by-pass 7, divided in the center by a partition 8. On opposite sides of the partition are openings 9, normally closed by a flexible sleeve 10, secured at its ends by means of rings 11. Suction within the pump 1 holds the sleeve 10 tightly against the cylinder 7, and prevents the passage of air toward the pump, whereas a sufficient amount of compression within the pump will force a current of air through the holes 9, around the partition 8, and outwardly through the end of the cylinder 7.

The outer end of the by-pass is connected by means of a tube 12 with an air-pipe 13, projecting upwardly into a milk-chamber 14, operatively mounted on a base 15, so as to have a reciprocating movement thereon.

At a point approximately one-third the distance from its inner end, the pump 1 is provided with a vent, opening into a valve-chamber 17, in which is a valve 18, held normally in closed position by means of a spring 19. In the outward movement of the piston 2 from the inner end of the cylinder, a partial vacuum is formed therein. Upon the piston passing the opening to the valve-chamber 17, the valve therein is opened by the suction in the pump 1, and such suction inparted through a tube 16, to the pipe 12, and thence through the pipe 13 to the milk-chamber 14, to perform the milking operation, as hereinafter disclosed.

At a point nearer its outer end the pump 1 is provided with an inlet pipe 20, provided with a hollow threaded plug 21, having openings 22 in its sides, through which air can be admitted to said pump. By this means the amount of suction caused by the piston, after passing said inlet, can be regulated. By adjustment of the plug, sufficient air can be admitted to neutralize the force of the piston beyond such inlet, or such inlet of air can be increased or diminished, as desired.

Centrally of the milk-chamber 14 is an inlet pipe 23, connected by means of a tube 24 with the union 25 of a milk-cup apparatus. Projecting upwardly from the union 25 are pipes 26, on which are mounted teat-cups 27, within which are auxiliary cups 28, formed of thin rubber or similar flexible material. The spaces between the cups 27 are connected by means of pipes 30 with a union 31, communicating by means of a tube 32 with the tube 12, between the milk-chamber and by-pass. The upper end of the pipe 23 is provided with a gravity valve 33.

The operation of the main part of the machine is similar to that set forth in said former applications. When a partial vacuum is formed in the milk-chamber 14, the milk from the cow's teats is drawn downwardly into the teat-cups, and thence through the union 25, tube 24 and pipe 23 to the milk-chamber, from whence it is discharged upon the succeeding compression movement of the pump.

When a partial vacuum has been formed in the pump 1 by the initial movement of the piston, and such piston passes the opening to the valve 18, practically one-half of the normal atmospheric pressure in the tubes 16 and 12, and milk chamber 14, is exhausted. The suction also raises the valve 33, and is imparted to the central channels of the teat-cups, causing a flow of milk through the union 25, tube 24 and pipe 23 to the milk-chamber. The same degree of suction is imparted through the tube 32 to the spaces 29 in the teat-cups, so that the pressure on the inside and on the outside of the flexible members 28 is uniform, and such members are without special effect upon the animal's teats. As the piston continues in its outward movement an even milking vacuum is maintained, until such piston passes the inlet 20, and beyond the same, if desired, by proper manipulation of the plug 21.

Upon the return movement of the piston, the air is compressed in the pump, the valve 18 being now closed against the escape thereof. When the pressure becomes sufficiently strong the air is forced through the by-pass 7. releasing the vacuum in the pipe 12 and chamber 14, which rises, permitting the discharge of the milk therein about the base 15. Air pressure is also imparted through the tube 32 to the spaces 29 in the teat-cups, tending to contract the members 28. At the same time the valve 33 closes, preventing the release of the suction in the tube 24 and center of the teat-cups. This facilitates the pressure of the air on the outside of the members 28, and causes a squeeze action on the teats contained therein. This results in a better circulation of the blood, which, under usual conditions, tends to accumulate in the teats, on account of the brief periods between pulsations, to permit its return upwardly.

There has been shown and described herein the preferred embodiment of my invention, but it can be used with any form of vibrating milk-chamber, similar to the one shown, and changes can be made in the other parts of the device, without departing from the spirit of the invention.

What I claim as my invention, and desire to secure, is:

In a device of the class described, a suction and pressure pump; a milk receiving and discharge chamber; a system of pipes connecting said pump and chamber; an air seal in said pipe system permitting movement of air from said pump to said chamber, under pressure, but preventing movement thereof in the opposite direction; an air seal in said pipe system, permitting movement of air from said chamber to said pump, under suction, and preventing the movement thereof in an opposite direction; a plurality of teat-cups each formed of an outer non-yielding shell and an inner contractible lining spaced apart therefrom and providing a central opening for the passage of milk; a conduit connecting said inner passages with said milk-chamber and provided with a valve at its discharge end; and means of connection between said system of pipes and said teat-cups to provide the same with alternating suction and pressure movements between said shells and inner linings, coincidently with the suction and pressure action of said pump.

In testimony whereof I affix my signature.

WARREN A. SHIPPERT.